Nov. 3, 1931.  H. W. CLARK  1,830,311
METER TESTING APPARATUS
Original Filed Oct. 2, 1928   2 Sheets-Sheet 1
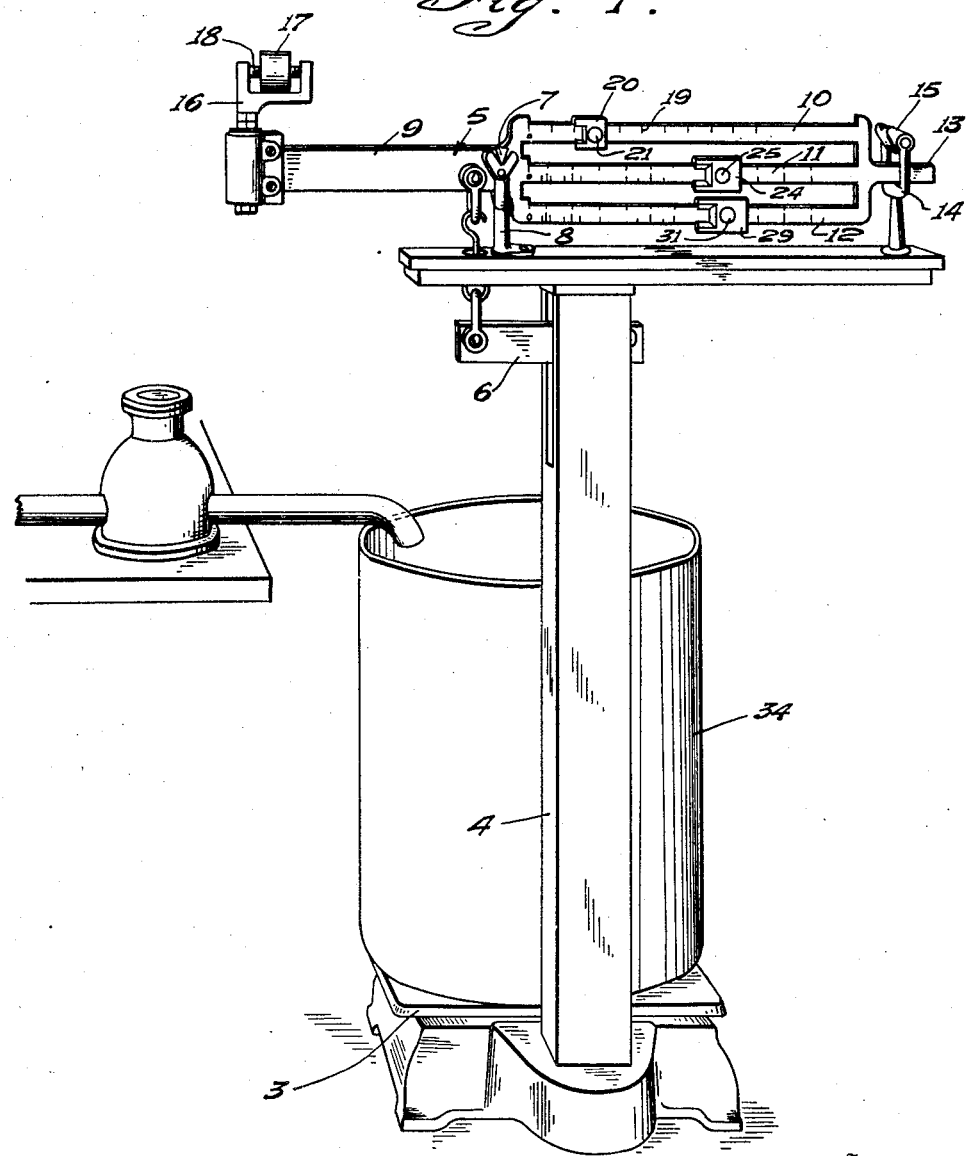
Inventor
HORACE W. CLARK
By
Attorney

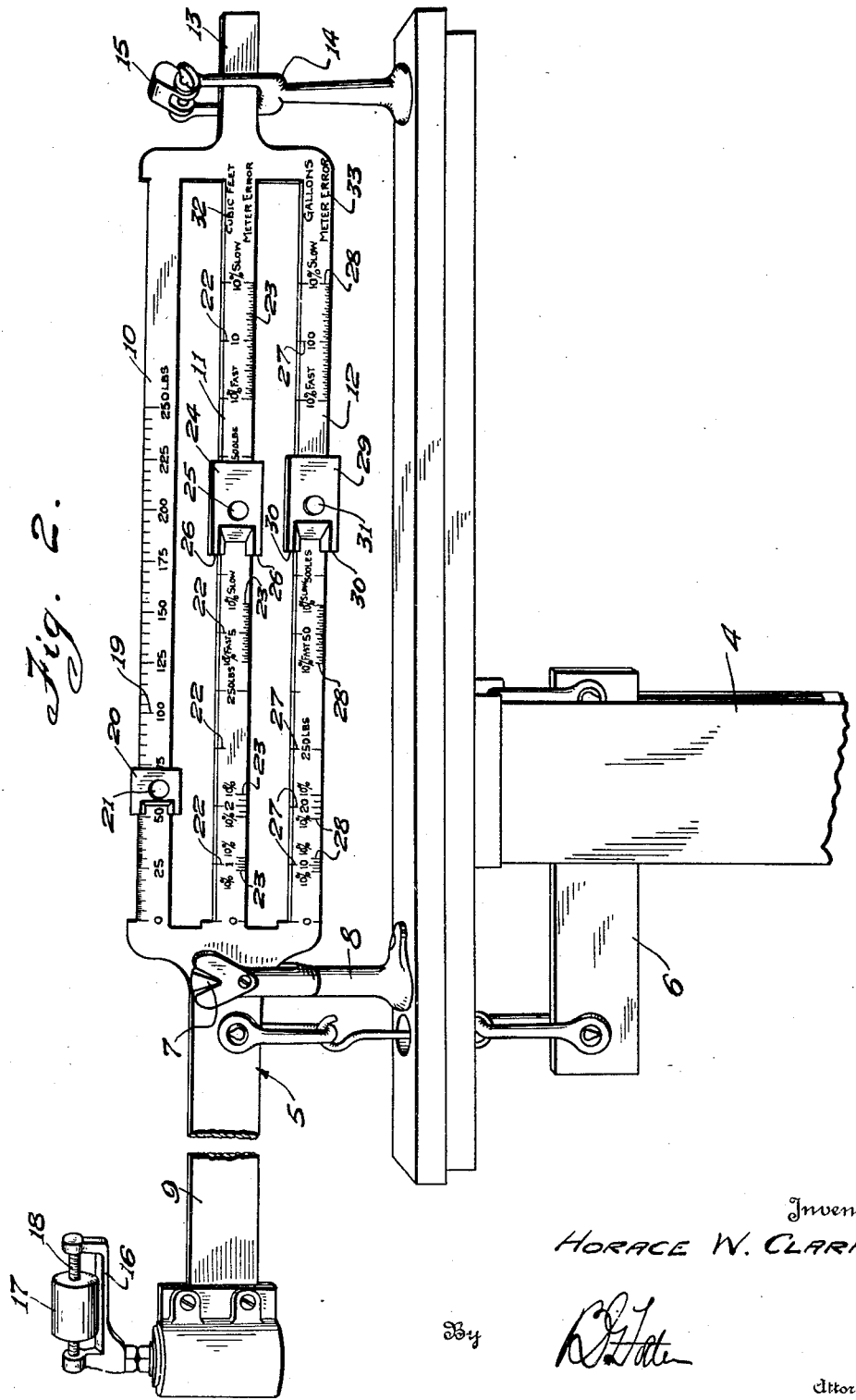

Patented Nov. 3, 1931

1,830,311

UNITED STATES PATENT OFFICE

HORACE W. CLARK, OF MATTOON, ILLINOIS; INEZ M. CLARK ADMINISTRATRIX OF SAID HORACE W. CLARK, DECEASED

METER TESTING APPARATUS

Application filed October 2, 1928, Serial No. 309,786. Renewed October 21, 1930.

In the testing of water and like liquid meters, a most satisfactory determination of the accuracy of the meter is by weighing the liquid measured in the test. Obviously if the water passed through the meter exceeds or falls short in weight—the weight of the actual amount of water indicated by the meter, such meter is in error. Heretofore a scale has been employed using a complicated set of weights and poises, which unless carefully and intelligently used, results in mistakes and errors in calculating the registrations made by the meters.

The object of the present invention is to provide a greatly simplified weighing apparatus that is not liable to be erroneously operated and controlled and which will quickly show up any errors in the meter whether of excess or shortage.

The preferred embodiment of the invention is illustrated in the accompanying drawings, wherein:—

Figure 1 is a perspective view somewhat diagrammatic in character, illustrating the testing apparatus.

Figure 2 is an enlarged view in elevation of the scale beam.

In the embodiment disclosed, a scale is provided including a platform 3 and a standard 4, on which is mounted a scale beam 5, the latter being connected to the platform 3 by any suitable mechanism 6 well known to the art.

The scale beam 5 is fulcrumed at 7 on a supporting bracket 8. It comprises a rear counterpoise-carrying arm 9 and a plurality of parallel bars 10, 11 and 12. These in turn terminate in a single finger 13 movably engaged in a keeper 14 and adapted to be locked by a cam 15. On the rear or free end of the arm 9 is mounted a bracket 16 carrying a counterpoise 17 adjustably threaded on a screw support 18 located in said bracket.

The upper bar 10 of the beam 5 is provided with a set of graduations 19, designating a successive series of pound weights and a poise 20 is slidable along said bar 10 and cooperates with the graduations 19 in a manner well understood. It is preferably provided with a set screw 21, by which it can be held at any desired point.

The second bar 11 is provided with graduations designating the correct weight of certain amounts of liquid measured in cubic feet and designated at different points on said bar by "1", "2", "5", and "10 cubic feet", for instance of water. These marks are indicated by the reference numeral 22. On either side of each of said graduations 22 are other graduations 23, indicating percentages of error, those on the left side representing a shortage of water due to the erroneous rapid registering of the meter and those on the right side correspondingly representing an excess of water over the correct amount, due to the slow registering of the meter. On the bar 11 is slidably mounted a poise 24 having a set screw 25, by which its position can be fixed. This poise, it will be understood, has spaced portions 26 that cooperate respectively with the graduations 22 and 23.

The third bar 12 is provided with graduations designating the various weights of different quantities of liquid measured in gallons, these graduations being indicated by the reference numeral 27. The lower portions of the bars are provided with graduations like the graduations 23 designating the percentage of corresponding errors of measurement. These graduations, indicating the percentage of errors on the bars 12 are designated by the reference numeral 28. The bar 12 furthermore has a poise 29 with pointers 30 that respectively cooperate with the graduations 27 and 28. A set screw 31 serves to hold this poise 29 at any point desired.

It will be noted that each of the bars 11 and 12 has a legend 32 and 33 setting forth the character of the measurements determined by the graduations and poises thereon.

Referring to Figure 1, in using this apparatus one or more meters are connected up to a source of supply, and water or other liquid passed therethrough is delivered into a container 34 placed upon the platform 3. When an amount of water determined by the meter has been delivered to the container, if in cubic feet, the poise 24 placed at the correct position, will of course counterbalance the amount of water or other liquid, providing the meter has correctly registered the same. If it has not and either falls short of or is in excess, the amount of such excess can be readily determined by moving the poise until the amount is balanced, whereupon the error will show by the lower pointer 26 of the poise cooperating with the graduations indicating the error. If the liquid is being determined by measurements in gallons, the lower bar 12 and its poise 29 is used. It will be understood that when either of the bars 11 or 12 is used the poise on the other is moved back to a neutral position. It will also be understood that the upper bar 10 and its poise 20 is employed for balancing the scale and empty container and that it also permits the use of the scale for ordinary weighing purposes.

From the foregoing, it is thought that the construction, operation and many advantages of the herein described invention will be apparent to those skilled in the art without further description and it will be understood that various changes in the size, shape, proportion and minor details of construction may be resorted to without departing from the spirit or sacrificing any of the advantages of the invention.

What I claim is:—

1. Fluid meter testing mechanism including a scale for weighing the measured fluid, said scale including a beam bar having a plurality of spaced graduations designating the correct weights of predetermined quantities of the fluid measured by the meters to be tested, said bar also having sets of percentage graduations, each set being grouped with a correct graduation and designating certain percentages of errors of measurements that may be made by such meters from the correct predetermined graduation, and a poise movable along the beam bar to both the correct graduations and to the error designating graduations associated therewith.

2. Fluid meter testing mechanism including a scale for weighing the measured fluid, said scale including a beam having a plurality of bars, one bar having graduations designating the correct weights of liquid measures of the fluid, measured by the meters to be tested, another bar having graduations designating the correct weights of cubic measures of the fluid measured by said meters, said graduations having associated therewith other graduations designating percentages of errors of measurement that may be made by said meters, and poises that are respectively movable along the different bars to the correct and error designating graduations, either poise being movable to a neutral position to permit the other to be used in the manipulation of the scale.

3. Fluid meter testing mechanism including a scale for weighing the measured fluid, said scale including a beam having a plurality of bars, one bar having graduations designating the correct weights of liquid measures of the fluid, measured by the meters to be tested, another bar having graduations designating the correct weights of cubic measures of the fluid measured by said meters, said graduations having associated therewith other graduations designating percentages of errors of measurement that may be made by said meters, poises that are respectively movable along the different bars to the correct and error designating graduations, either poise being movable to a neutral position to permit the other to be used in the manipulation of the scale, and a counterpoise on the scale beam common to all the beam bars.

4. Fluid meter testing mechanism including a scale for weighing the measured fluid, said scale including a beam having a plurality of bars, one of said bars having graduations designating different weights and a poise on said bar for counterbalancing the container of the fluid measured by the meter, a second bar having graduations designating the correct weights of liquid measures of the fluid measured by the meters to be tested, a third bar having graduations designating the correct weights of cubic measures of the fluid measured by said meters, said graduations having associated therewith other graduations designating percentages of errors of measurement that may be made by said meters, and poises that are respectively movable along the second and third bars to the correct and error designating graduations, either poise being movable to a neutral position to permit the other to be used in the manipulation of the scale.

5. Fluid testing mechanism including a scale for weighing the measured fluid, said scale including a beam bar having a graduation designating the correct weight of a predetermined quantity of fluid measured by the meters to be tested, said bar also having a set of percentage graduations extending on opposite sides of the correct graduation, said percentage graduations on one side of the correct graduation designating errors due to shortage of fluid measured by the meters and those on the opposite side designating corresponding errors due to excess of fluid measured, and a poise movable along the beam to both the correct and to the error designating graduations associated therewith.

6. Fluid meter testing mechanism including a scale for weighing the fluid measured by a meter, having means for indicating the percentage of shortage or excess of fluid actually passed by the meter and weighed by the scale in relation to that indicated by said meter as passed thereby, said means comprising a member having error indicating elements and a determining member that cooperates with the indicating elements, one of said members being operated by the fluid measured by the meter.

7. Fluid meter testing mechanism including a container for the fluid passed through the meter, a scale for weighing the fluid in the container having means for indicating the percentage in shortage or in excess of fluid indicated by the meter as passed therethrough relative to the actual amount so passed and weighed by the scale, said means including a member having elements that indicate percentages of error and an error determining member that cooperates with the indicating elements, one of said members being operated by the weight of the fluid introduced into the container.

In testimony whereof, I affix my signature.
HORACE W. CLARK.